(12) United States Patent
Wong et al.

(10) Patent No.: US 6,957,911 B2
(45) Date of Patent: Oct. 25, 2005

(54) INFANT THERMOMETER

(75) Inventors: Anthony Wong, Franklin, MA (US);
Jerome V. Tomaselli, Watertown, MA (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 10/602,561

(22) Filed: Jun. 24, 2003

(65) Prior Publication Data

US 2004/0264546 A1 Dec. 30, 2004

(51) Int. Cl.[7] .............................. G01K 1/00; G01K 7/00
(52) U.S. Cl. ...................................... 374/208; 374/163
(58) Field of Search ................................ 374/209, 208, 374/158, 192, 194, 187, 210, 163, 100; 600/549, 600/474

(56) References Cited

U.S. PATENT DOCUMENTS

| | | | |
|---|---|---|---|
| 210,274 A | | 11/1878 | Stohlmann |
| 343,678 A | * | 6/1886 | Tatum ........................ 220/813 |
| 2,283,599 A | | 5/1942 | Dickinson |
| 2,329,685 A | * | 9/1943 | Baker ......................... 374/208 |
| 2,351,107 A | | 6/1944 | Charnysh |
| 3,338,390 A | | 8/1967 | Gordon |
| D252,104 S | | 6/1979 | Nagy et al. |
| 4,165,000 A | | 8/1979 | Poncy |
| D267,154 S | | 12/1982 | Bilgutay |
| 4,444,517 A | | 4/1984 | Murase |
| 4,457,633 A | * | 7/1984 | Andrews ..................... 374/209 |
| D284,096 S | | 6/1986 | Desjacques |
| D284,399 S | | 6/1986 | Fukuda |
| D285,182 S | | 8/1986 | Wada et al. |
| D287,829 S | | 1/1987 | Osaka |
| D293,085 S | | 12/1987 | Yokoyama |
| D293,654 S | | 1/1988 | Kawamura |
| 4,729,672 A | | 3/1988 | Takagi |
| 4,741,627 A | * | 5/1988 | Fukui et al. ................. 374/208 |
| D298,219 S | | 10/1988 | Muller |
| D299,700 S | | 2/1989 | Yubisui et al. |
| D299,907 S | | 2/1989 | Brown, Jr. et al. |
| 5,013,161 A | | 5/1991 | Zaragoza et al. ........... 374/208 |
| 5,133,606 A | | 7/1992 | Zaragoza et al. |
| D330,170 S | | 10/1992 | Arioka |
| 5,165,798 A | | 11/1992 | Watanabe |
| D337,533 S | | 7/1993 | Zaragoza |
| D345,927 S | | 4/1994 | Yoshikawa |
| D346,120 S | | 4/1994 | Yoshikawa |
| 5,575,563 A | | 11/1996 | Chiu et al. |

(Continued)

FOREIGN PATENT DOCUMENTS

DE          3838620 A1 *  6/1989    ............ G01K 5/20

(Continued)

*Primary Examiner*—Gail Verbitsky
*Assistant Examiner*—Mirellys Jagan
(74) *Attorney, Agent, or Firm*—Barnes & Thornburg LLP (57) ABSTRACT

An infant thermometer assembly includes a cover portion and a thermometer portion pivotably coupled to the cover portion and pivotably movable relative to the cover portion about a pivot axis between a use position and a stowed position. The thermometer portion includes a probe and a housing coupled to the probe. The housing includes a display screen and a power button. The cover portion includes a cavity formed to receive at least a portion of the housing of the thermometer portion in the use and stowed positions and a cut-out formed to receive the probe of the thermometer portion in the stowed position.

30 Claims, 5 Drawing Sheets

U.S. PATENT DOCUMENTS

| | | |
|---|---|---|
| D379,936 S | 6/1997 | Wei-Hsin |
| 5,709,476 A * | 1/1998 | Wu et al. .................. 374/208 |
| 5,775,488 A | 7/1998 | Vaught |
| 5,991,652 A * | 11/1999 | Barthelemy et al. ........ 600/474 |
| D420,604 S | 2/2000 | Katzman et al. |
| D420,924 S | 2/2000 | Tseng |
| D443,838 S | 6/2001 | Kleiman et al. |
| D447,707 S | 9/2001 | Kobayashi |
| D449,239 S | 10/2001 | Kern |
| D453,476 S | 2/2002 | Wirz et al. |
| 6,406,182 B1 | 6/2002 | Chen |

FOREIGN PATENT DOCUMENTS

| | | | | |
|---|---|---|---|---|
| EP | 88672 A1 * | 9/1983 | ............ | G01K 1/08 |
| JP | 61296226 A * | 12/1986 | ............ | G01K 7/00 |
| JP | 02280021 A * | 11/1990 | ............ | G01K 1/08 |

* cited by examiner

INFANT THERMOMETER

BACKGROUND

The present disclosure relates to thermometers and particularly to a digital infant thermometer. More particularly, the present disclosure relates to infant thermometer assemblies having a thermometer portion and a cover portion.

Infant thermometers include a temperature probe for measuring the body temperature of a patient as well as a body or housing including a digital display, for example, for displaying the temperature registered by the probe. Many thermometers are provided with a carrying case or cover for storing the thermometer when the thermometer is not in use.

SUMMARY

According the present disclosure, an infant thermometer assembly includes a cover portion and a thermometer portion pivotably coupled to the cover portion. The thermometer portion includes a probe and a housing coupled to the probe. The housing includes a display and a power button. The thermometer portion is pivotably movable relative to the cover portion about a pivot axis between a use position and a stowed position. The cover portion includes a cavity formed to receive at least a portion of the housing in the use and stowed positions as well as a cut-out formed to receive the probe of the thermometer portion in the stowed position.

The cover portion of the infant thermometer assembly includes a body, a first arm coupled to the body, and a second arm coupled to the body. The first and second arms are spaced-apart from each other to define the cavity of the cover portion therebetween. The first and second arms of the cover portion are coupled to the housing of the thermometer portion. The first arm of the cover portion includes a first slot and the second arm of the cover portion includes a second slot. Each of the first and second slots are formed to receive a respective first and second locking lug of the housing therethorough. Each slot includes a first end, a second end, and a narrowed neck between the first and second ends.

In addition to being movable between the use and stowed positions, the infant thermometer assembly is also movable between a locked position where each locking lug of the housing is positioned between the narrowed neck and the second end of the respective slot and an unlocked position where each locking lug of the housing is positioned between the narrowed neck and the first end of the respective slot. When the infant thermometer assembly is in the unlocked position, the thermometer portion is pivotable about an axis extending through the first and second locking lugs to move the thermometer portion between the use and stowed positions.

Features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompany figures in which:

FIGS. 5–7 illustrate the infant thermometer assembly of the present disclosure moving from the opened, use position to the closed, stowed position and show the thermometer portion of the assembly pivoting about an axis generally extending through the lugs of the thermometer portion to the stowed position where the probe of the thermometer portion is received within the cut-out portion of the cover portion;

DETAILED DESCRIPTION

Figure 3:
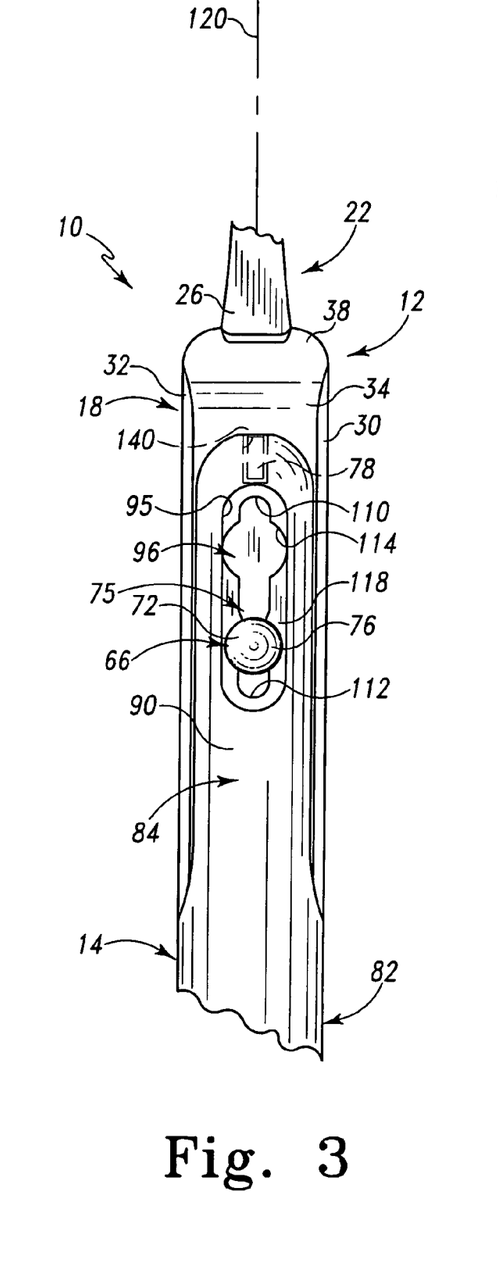
FIG. 3 is a side view, with portions broken away, of the infant thermometer assembly of the present disclosure showing the thermometer portion of the assembly in a locked position with respect to the cover portion, and also showing a lug of the thermometer portion received within a slot of the cover portion and positioned at a first end of the slot.
Figure 4:
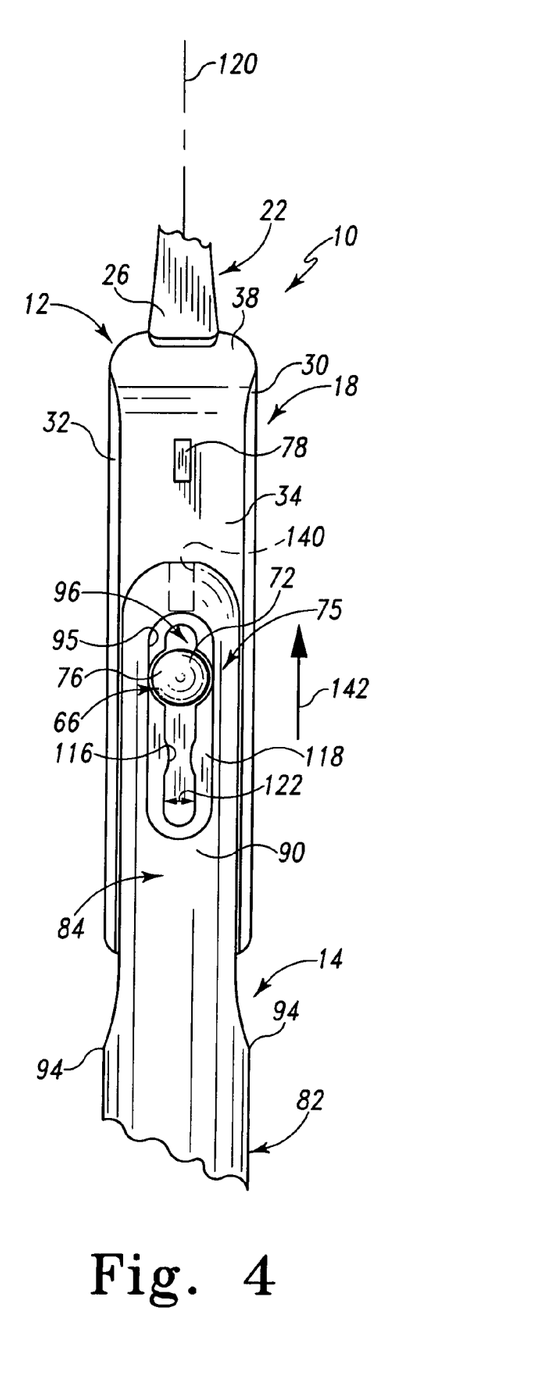
FIG. 4 is a side view similar to FIG. 3 showing the infant thermometer assembly in an unlocked position to allow the thermometer portion to pivot relative to the cover portion between the use and stowed positions, and also showing the lug of the head portion positioned at a second end of the slot.
Figures 5, 6:
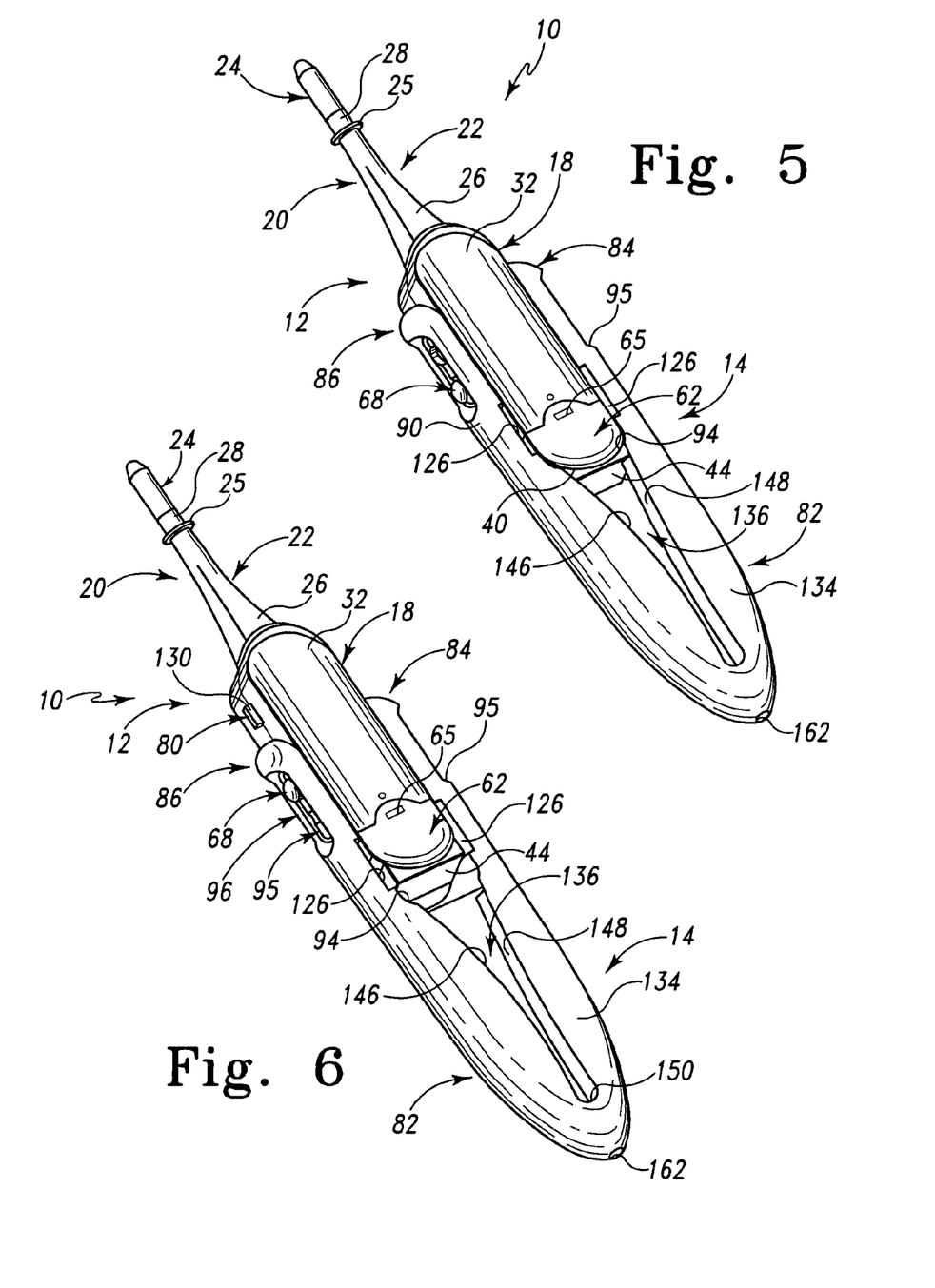
FIG. 5 is a rear perspective view of the assembly of the present disclosure showing the assembly in the locked and use positions.
FIG. 6 is a rear perspective view similar to FIG. 5 showing the thermometer in the unlocked and use positions to enable a user to rotate the thermometer portion of the assembly to the stowed position shown in FIG. 8.
Figures 7, 8:
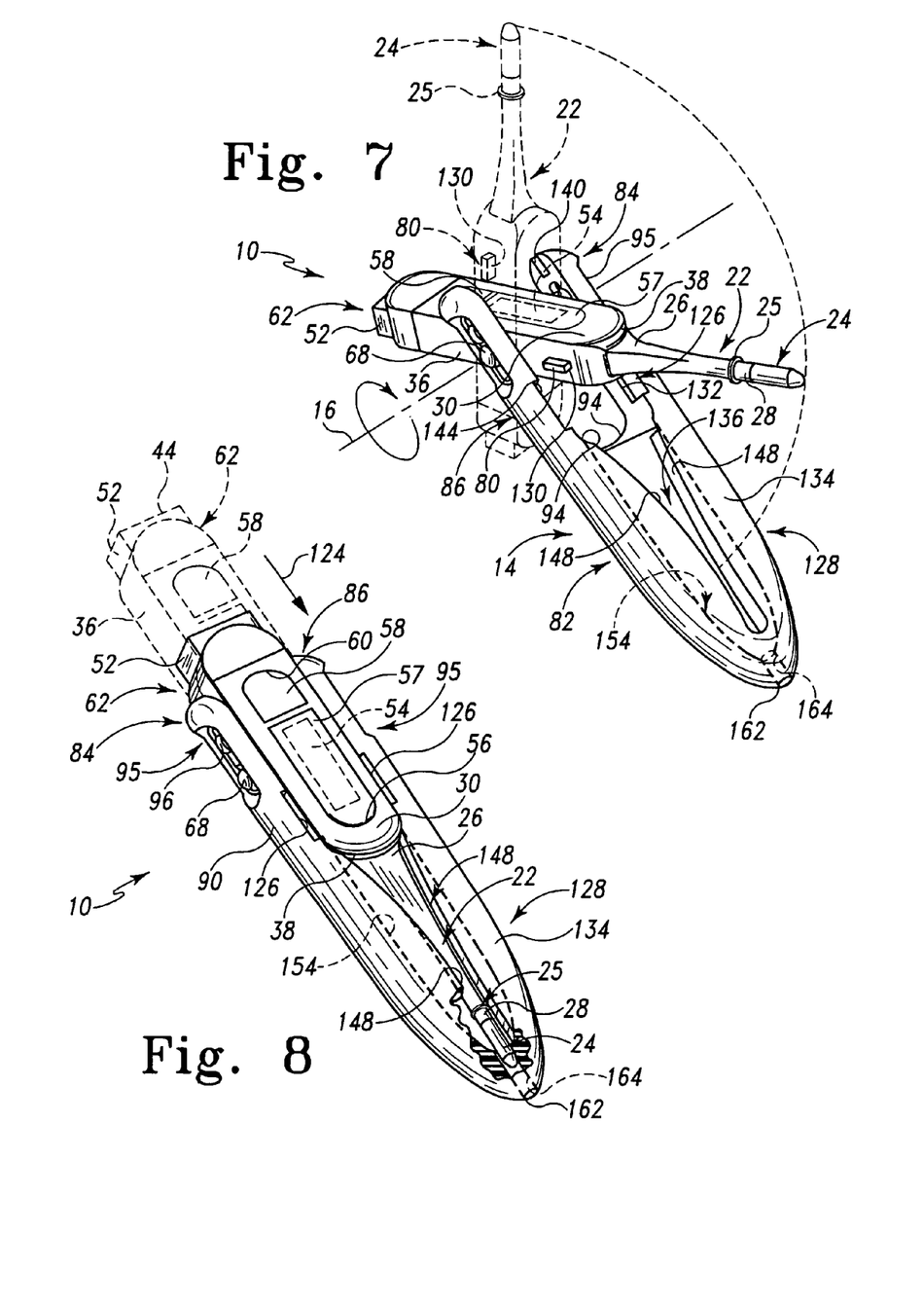
FIG. 7 is a perspective view of the infant thermometer showing the thermometer portion being pivoted about the pivot axis relative to the cover portion toward the stowed position.
FIG. 8 is a rear, perspective view of the infant thermometer assembly showing the assembly in the stowed and locked positions, and further showing, in phantom, the assembly in the unlocked position.

An infant thermometer assembly 10 of the present disclosure includes a thermometer portion 12 equipped to take the temperature of a patient and a cover portion 14 coupled to the thermometer portion 12 to cover and store a probe 20 of thermometer portion 12. Thermometer portion 12 is pivotably coupled to the cover portion 14 for movement between an opened, use position, as shown in FIG. 5, and a closed, stowed position, as shown in FIG. 8. To move thermometer assembly 10 between the use and stowed positions, a user moves thermometer assembly 10 from a locked position, as shown for example in FIG. 3, to an unlocked position, as shown in FIG. 4. Once in the unlocked position, thermometer portion 12 is pivotable about a pivot axis 16 (shown in FIG. 8) relative to cover portion 14. In the stowed position, cover portion 14 acts to cover and protect probe 20 of thermometer portion 12 while thermometer assembly 10 is not in use.

Figure 1:
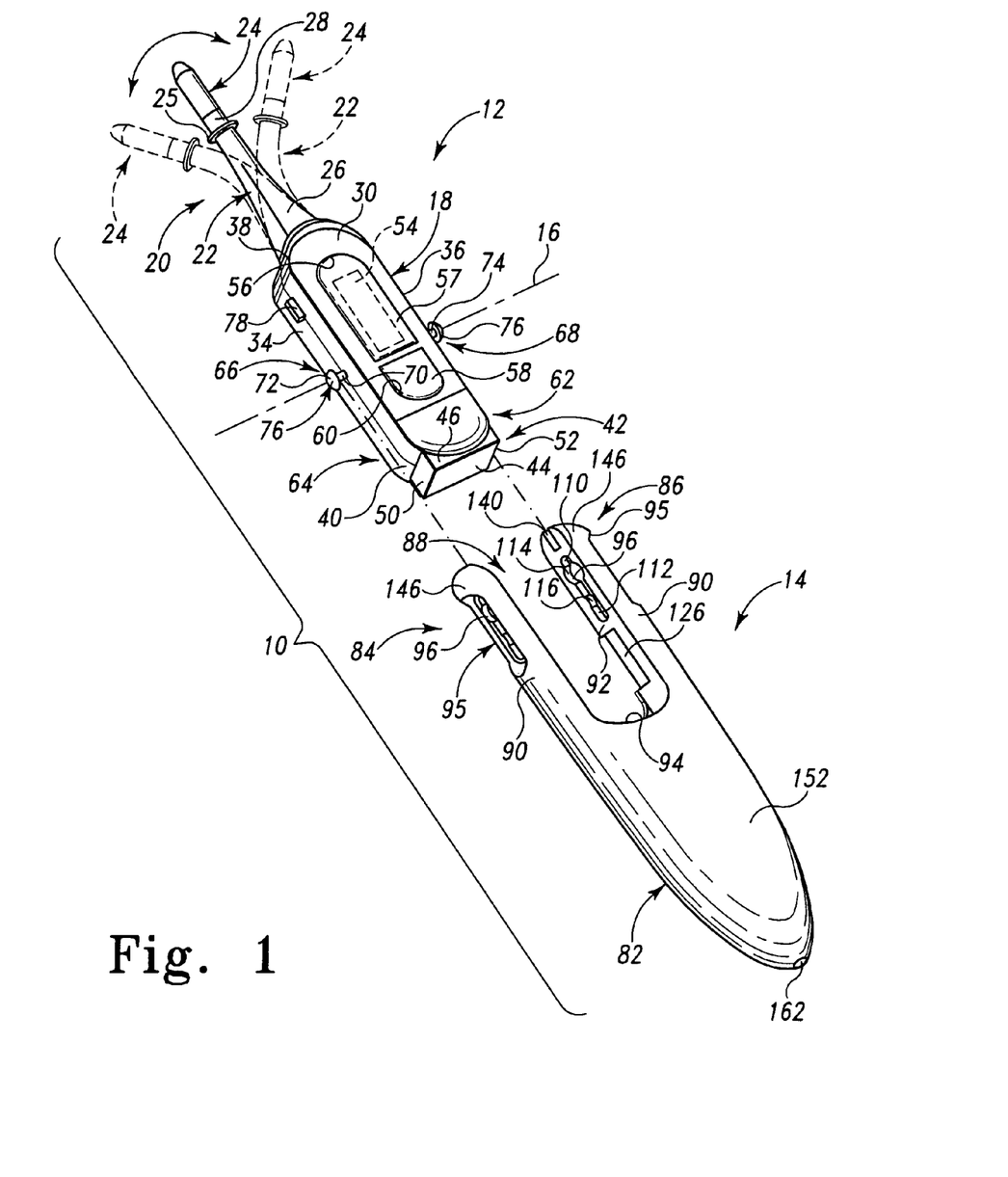
FIG. 1 is a front, perspective, exploded view of an infant thermometer assembly of the present disclosure showing the assembly including a cover portion and a thermometer portion normally coupled to the cover portion for pivotable movement between an opened, use position (shown in FIG. 5) and a closed, stowed position (shown in FIG. 8)

As shown in FIG. 1, thermometer portion 12 of thermometer assembly 10 includes a housing 18 and probe 20 coupled to housing 18. Probe 20 includes an elongated neck portion 22 coupled to housing 18 and a tip portion 24 coupled to neck portion 20. Illustratively, tip portion 24 is metallic for improved thermal conductivity and may be made of a variety of metallic materials such as stainless steel, for example. The neck portion 22 of the illustrative probe 20 includes a first end 26 coupled to housing 18 and a second end 28 coupled to tip portion 24. Illustrative neck portion 22 is made of a flexible, resilient material to allow the probe 20 to flex, as shown in FIG. 1. Flexible probe 20 flexes or bends, for example, while in a patient's mouth for added comfort. Oral measurement can be safely and easily made without causing discomfort to the patient due, at least in part, to the flexibility of probe 20. A wide variety of flexible, resilient materials are suitable such as rubber, thermoplastics, latex, elastomeres, etc.

An over-insertion ring or gauge 25 is located at second end 28 of neck portion 22 near the tip portion 24 and is provided for rectal positioning of assembly 10. Over-insertion gauge 25 is made of the same flexible material as neck portion 22. Gauge 25 indicates the correct depth of insertion into the rectum and prevents the probe 20 of thermometer portion 12 from being inserted too far into the rectum, thus assuring that the correct rectal temperature is obtained.

Figure 2:
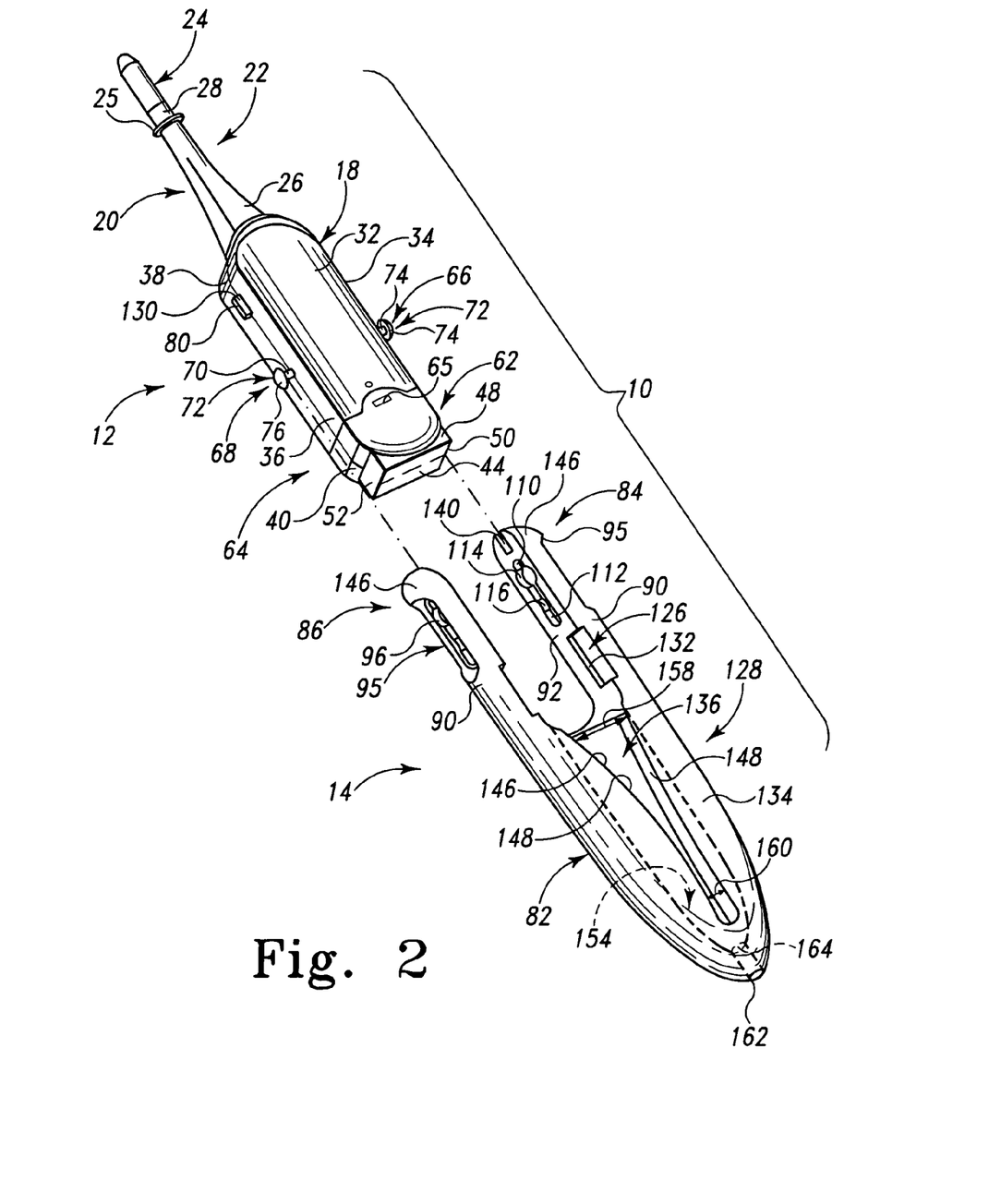
FIG. 2 is a rear, perspective, exploded view of the infant thermometer assembly of FIG. 1 showing the cover portion including a cut-out portion for receiving a probe of the thermometer portion therein when the infant thermometer assembly is in the stowed position.

Housing 18 of thermometer portion 12 includes a front wall 30, a rear wall 32 (shown in FIG. 2), and opposite side walls 34, 36. Illustratively, housing 18 of thermometer portion 12 also includes a curved top wall 38 coupled to front, rear, and side walls 30, 32, 34, 36 in addition to a curved bottom wall 40 spaced-apart from curved top wall 38 and also coupled to front, rear, and side walls 30, 32, 34, 36. As shown in FIGS. 1 and 2, first end 26 of probe 20 is coupled to curved top wall 38 of housing 18.

A stand 42 is coupled to curved bottom wall 40 of housing 18 and includes an end wall 44, front and rear walls 46, 48, respectively, and side walls 50, 52. Each wall 44, 46, 48, 50, 52 defines a generally flat surface. Stand 42 allows thermometer assembly 10 to stand upright on a countertop or generally flat surface when thermometer assembly 10 is in the closed and locked positions, as shown in FIG. 8, for example, Thermometer portion 12 is an electronic clinical thermometer having a digital display 54 (shown in phantom) positioned within a window 56 of housing 18. Housing 18 thus houses the digital display 54 as well as electrical elements in communication with a temperature sensing element (not shown) located within probe 20 for converting the temperature measured by the temperature sensing element into a digital readout on the display 54. The digital display 54 may be a liquid crystal display (LCD), a light emitting diode (LED), or another suitable display for displaying the patient's temperature. An illustrative transparent cover 57 is provided to cover window 56 and allow a user to read the readout on the display 54 within housing 18. An on/off push button 58 is positioned within another window or aperture 60 formed in front wall 30 of housing 18 and located below cover 57. Push button 58 is activated by application of pressure in a direction generally perpendicular to the surface of front wall 30.

It should be noted that numerous patents teach circuits suitable for electronic clinical thermometers and the circuit components are readily available commercially. Also, electrical components such as the digital display, means to produce an audible sound, and the manually operable switch are available commercially. The circuit board can easily be designed to accommodate the conditions of use for the thermometer assembly 10 disclosed herein.

A battery pack 62 of housing 18 is also provided, as shown in FIGS. 1 and 2. Battery pack 62 is essentially a bottom end portion 64 of housing 18. Thus, battery pack 62 includes bottom wall 40 and a bottom portion of front wall 30, rear wall 32, and side walls 34, 36 of housing 18 as well as stand 42. As shown in FIG. 2, a small notch 66 of battery pack 62 is provided in the bottom portion of rear wall 32 to allow a user to open and remove battery pack 62 from the rest of housing 18. A battery (not shown) within battery pack 62 acts as a power source for thermometer portion 12.

Housing 18 further includes a first locking lug 66 appended to side wall 34 and a second locking lug 68 appended to side wall 36. Each lug 66, 68 includes a stem 70 and a head 72 coupled to stem 70. Illustrative stem 70 is cylindrical in shape and is narrower than head 72. Illustratively head 72 is in the shape of a semi-sphere having a flat undersurface 74 and a curved outer surface 76. Pivot axis 16, shown in FIGS. 1 and 8, runs through the first and second lugs 66, 68. As is described in more detail below, thermometer portion 12 of thermometer assembly 10 rotates about pivot axis 16 relative to cover portion 14 when moving between the opened, use position and the closed, stowed position.

First and second guide tabs 78, 80 of housing 18 are provided, as is discussed in more detail below, to properly align thermometer portion 12 with cover portion 14 as thermometer assembly 10 is moved to the opened, use and locked positions. First guide tab 78 (as shown in FIG. 1) is appended to side wall 34 while second guide tab 80 is appended to side wall 36 (as shown in FIG. 2). Illustratively, first guide tab 78 is spaced-apart from and positioned above first lug 66 along side wall 34 in a direction toward probe 20. Similarly, second guide tab 80 (shown in FIG. 2) is spaced-apart from and positioned above second lug 68 along side wall 36 in a direction toward probe 20.

Looking now to FIGS. 1 and 2, cover portion 14 includes a body 82 and first and second arms 84, 86 coupled to body 82. Arms 84, 86 are positioned in spaced-apart relation to one another to define a generally U-shaped cavity 88 therebetween for receiving at least a portion of thermometer portion 12 therein when thermometer assembly 10 is in both the opened, use position (as shown in FIG. 5) and the closed, stowed position (as shown in FIG. 8). A top edge 94 of body 82 also cooperates with first and second arms 84, 86 to define U-shaped cavity 88. Illustratively, first and second arms 84, 86 are molded as one component integrally coupled to body 82. However, it is within the scope of this disclosure for arms 84, 86 to be molded separately from body 82 and coupled to body 82.

Each arm 84, 86 of cover portion 14 includes an outer, curved wall 90 and an inner, flat wall 92 which cooperates with a top edge 94 of body 82 to generally define U-shaped cavity 88. A cut-out portion 95 is formed in curved wall 90 of each arm 84, 86 to reveal a slot 96 formed through inner, flat wall 92 of each respective arm 84, 86. Illustratively, each cut-out portion 95 is generally oval in shape. Each slot 96 receives one of first and second locking lugs 66, 68 of thermometer portion 12 therein to pivotably couple thermometer portion 12 to cover portion 14. As shown in FIGS. 3 and 4, each slot 96 is generally long and narrow and defines a first end 110, a second end 112, a widened, circular portion 114 near first end 110, and a narrowed, neck portion 116 near second end 112.

Stem 70 of each lug 66, 68 is received through respective slot 96. Flat surface 74 of the head 72 of each lug 66, 68 engages an outer surface 118 of the inner, flat wall 92 of each arm 84, 86 viewable through the cut-out portion 95 of curved wall 90. When unlocked, thermometer portion 12 is movable along a vertical axis 120 extending along probe 20, as shown in FIG. 8. Head 72 of each lug 66, 68 is larger than an illustrative widths 122 of each slot near ends 110 and 112, as shown in FIGS. 3 and 4. However, widened, circular portion 114 is similar in size to head 72 of lugs 66, 68. As is discussed in greater detail below, widened, circular portion 114 acts as a visual indicator to the user to indicate generally where lugs 66, 68 are to be positioned once thermometer assembly 10 has been moved to the unlocked position for pivotable movement of thermometer portion 12 relative to cover portion 14 between the opened, use and closed, stowed positions.

Narrowed neck portion 116 of each slot 96 is provided to maintain the thermometer assembly 10 in the locked position to prevent movement of thermometer portion 12 relative to cover portion 14. As is discussed in greater detail below, thermometer assembly 10 is lockable in either the opened or closed positions once thermometer portion 12 is properly aligned with cover portion 14 and thermometer portion 12 has been moved by a user in a direction toward body 82 of cover portion 14, as indicated by arrow 124 in FIG. 8. Stem 70 of each lug 66, 68 is forced by the user past the narrowed neck portion 116 of each respective slot 96 to snap thermometer portion 12 to cover portion 14 so that thermometer assembly 10 is in the locked position. Locking lugs 66, 68 are thus positioned to reside at the second end 112 of each respective slot 96 when thermometer assembly 10 is in the locked position. A user may pull thermometer portion 12 in a direction away from cover portion 14 to move lugs 66, 68 past narrowed, neck portion 116 of each slot 96 to move thermometer assembly 10 to the unlocked position.

The locking lugs 66, 68 and respective slots 96 provide a mounting means 75, as shown in FIGS. 3 and 4, for mounting the thermometer portion 12 to the cover portion 14 for movement of the thermometer portion 12 relative to the cover portion 14 between the locked position, to prevent the thermometer portion 12 from moving relative to the cover portion 14, and the unlocked position, to permit the thermometer portion 12 to move relative to the cover portion 14. The mounting means 75 also provides form movement of the thermometer portion 12 relative to the cover portion 14 between the opened, use position and the closed, stowed position.

Although mounting means 75 of illustrative infant thermometer assembly 10 includes locking lugs 66, 68 of thermometer portion 12 and slots 96 of cover portion 14, it is within the scope of this disclosure to include a thermometer assembly having other suitable means for mounting the thermometer portion to the cover portion for movement between locked and unlocked positions as well as for movement between use and stowed positions. For example, a suitable mounting means may include a spring-release mechanism having a loaded torsion spring which, upon release, causes the cover portion of the assembly to rotate relative to the thermometer portion to the opened position, for example. Further, another mounting means may include lugs or pivot pins coupled to the cover portion and received within slots or a guide track formed in the thermometer portion. A suitable mounting means may also include bearings which permit rotational movement between the cover portion and the thermometer portion of the infant thermometer assembly.

Each arm 84, 86 of cover portion 14 further includes a notch 126 formed in a rear side 128 of cover portion 14 shown in FIG. 2. Notch 126 is formed in inner, flat wall 92 and a portion of outer, curved wall 90 of each arm 84, 86. Each notch 126 receives a respective one of the first and second alignment tabs 78, 80 coupled to housing 18 of thermometer portion 12 when thermometer assembly 10 is in the locked and closed positions. When in the closed position, a rear surface 130 of each guide tab 78, 80 is positioned to lie adjacent a ledge 132 of the respective notch 126 Illustrative notches 126 are each positioned below a respective slot 96 along a respective arm 84, 86.

A guide slot 140 is also formed in each arm 84, 86. Each guide slot 140 is formed at a top end 146 of each respective arm 84, 86. Each guide slot 140 is formed in inner, flat wall 92 and a portion of outer, curved wall 90 of the respective arm 84, 86. Guide slots 140 are provided to receive a respective guide tab 78, 80 therein when thermometer assembly 10 is in the locked and use positions. Specifically, guide slots 140 are provided to properly align thermometer portion 12 with cover portion 14 when thermometer assembly 10 is in the unlocked and use positions, as shown in FIG. 4, for example. In use, for example, the user aligns guide tabs 78, 80 with respective guide slots 140 before moving thermometer 10 to the locked position.

Looking now to FIG. 2, a rear wall 134 of rear side 128 of body 82 of cover portion 14 defines a probe-shaped cut-out 136 formed to receive probe 20 therein when thermometer assembly 10 is in the closed position, as shown in FIG. 8. Cut-out 136 provides an area where probe 20 may be safely stowed and protected when thermometer assembly 10 is not in use. Thus, cover portion 14 acts as a protective cover for probe 20. As mentioned above, body 82 of cover portion 14 further includes front wall 152, shown in FIG. 1, coupled to rear wall 134. Front wall 152 and rear wall 134 of body 82 are each curved and coupled to each other at side portions of each of the front and rear walls 152, 134. The front and rear walls 152, 134 cooperate to define a hollow area 154 in communication with cut-out 136 and cavity 88 defined by first and second arms 84, 86 of cover portion 14. As shown in FIG. 2, cut-out 136 and notches 126 of first and second arms 84, 86 are each formed in rear side 128 of cover portion 14.

As mentioned above, probe-shaped cut-out 136 is formed in rear wall 134 and is defined by an edge 148, shown best in FIG. 2. Edge 118 of cut-out 136 creates a first width 158 of cut-out 136 and a second width 160 smaller than first width 158 such that edges 148 of cut-out 136 converge from first width 158 to second width 160 to create a suitable opening for receiving the illustrative probe 20 therein. It is within the scope of this disclosure, however, to include a thermometer assembly having a probe of another suitable shape and including a coordinating cut-out within a cover portion to receive that particular probe in a stowed position.

An aperture 162 is formed through body 82, as shown in FIG. 2. Aperture is formed through a portion of front and rear walls 152, 134 to provide a passageway or bore 164 in communication with hollow area 154 and cut-out 136 of body 82. As shown in FIG. 8, tip portion 24 of probe 20 is positioned within passageway 164 when thermometer portion 12 is in the stowed and locked positions.

In operation, a user is able to move thermometer 10 between locked and unlocked positions. When in the unlocked position, thermometer 10 is movable between the opened, use position (as shown in FIG. 5) and the closed, stowed position (as shown in FIG. 8). Looking now to FIG. 5, thermometer assembly 10 is shown in the locked and use positions. As shown, probe 20 is extended away from cover portion 14 in the use position. Further, rear wall 32 of thermometer portion 12 is aligned substantially with a rear wall 134 of cover portion 14. Similarly, front wall 30 of thermometer portion 12 is aligned substantially with a front wall 152 of cover portion 14.

In the locked and use positions, thermometer assembly 10 is ready to be used by a user. Probe 20 may be used to read a child's temperature, for example. Guide tabs 78, 80 of thermometer portion 12 are received within alignment slots 140 of cover portion 14. Locking lugs 66, 68 are positioned near second end 112 of slots 96 of each arm 84, 86 of cover portion 14 below narrowed neck portion 116, as shown in FIG. 3, for example. Stand 42 of thermometer portion 12 is received within U-shaped cavity 88 of cover portion 14 so that bottom, curved wall 40 of housing 18 engages edge 94 of body 82 of cover portion 14.

To move the thermometer 10 assembly to the unlocked position the user urges thermometer portion 12 in a direction away from cover portion 14 along vertical axis 120, as shown by arrow 142 in FIG. 4. The user urges lugs 66, 68 of thermometer portion 12 past neck portion 116 of each slot 96 to unlock thermometer portion 12 from cover portion 14 to allow thermometer portion 12 to pivot freely with respect to cover portion 14. Once in the unlocked position, lugs 66, 68 are movable up and down within respective slots 96 between neck portion 116 and first end 110 to allow thermometer portion 12 to move freely along axis 120.

In the unlocked and use positions, as shown in FIG. 6, guide tabs 78, 80 are removed from within guide slots 140 and lugs 66, 68 are positioned above neck portion 116 of respective slots 96. Thus, thermometer portion 12 is able to pivot about pivot axis 16, as shown, for example, in FIG. 7. Pivoting movement of thermometer portion 12 relative to cover portion 14 is permitted in either direction about pivot axis 16. However, pivoting movement in a clockwise direction as shown in FIG. 7 will move thermometer portion 12 from the use position to the stowed position where a portion of housing 18 is received within cavity 88 of cover portion 14 and probe 20 of thermometer portion 12 is received within cut-out 136 of cover portion 14 for storage.

In order to properly align thermometer portion 12 with cover portion 14 while moving thermometer assembly 10 to the stowed position, lugs 66, 68 are to be aligned approximately with widened, circular portion 114 of each respective slot 96, as shown in FIG. 4. Alignment of lugs 66, 68 with circular portion 114 of each respective slot 96 ensures that as thermometer portion 12 is rotated clockwise toward the stowed position, guide tabs 78, 80 will clear an edge 144 of each respective notch 126 to lie within each notch 126. Alignment of lugs 66, 68 with circular portion 114 also ensures that probe 20, including over-insertion gauge 25, is able to slide between edges 148 defining cut-out portion 136 to be received within cut-out portion 136, as shown in phantom in FIG. 8.

Once probe 20 has been received within cut-out portion 136 and housing 18 has been received within U-shaped cavity 88 the user may move thermometer assembly 10 to the locked position. To move assembly 10 to the locked position, thermometer portion 12 is moved along the vertical axis 120 in a downward direction toward cover portion 14 to move locking lugs 66, 68 past neck portion 116 of each respective slot 96 to lie at second end 112 of each slot 96.

When in the locked and stowed positions, as shown in FIG. 8, top curved edge 38 of housing 18 engages top edge 94 of back wall of cover portion 14. Tip 24 of probe 20 is received within a passageway 164 of cover portion 14 which between cut-out 136 and hole 162.

Although this invention has been described in detail with reference to certain embodiments, variations and modifications exist within the scope and spirit of the invention as described and defined in the following claims.

What is claimed is:

1. An infant thermometer assembly comprising a thermometer portion including a probe having a flexible tip portion and a housing coupled to the probe and a cover portion pivotably, fixedly and slidably coupled to the thermometer portion, the cover portion defining a cavity formed to receive at least a portion of the thermometer portion in a use position and a stowed position of the thermometer portion and defining a cut-out formed to receive the probe of the thermometer portion in the stowed position.

2. An infant thermometer assembly comprising
a thermometer portion including a probe having a flexible tip portion and a housing coupled to the probe,
a cover portion coupled to the thermometer portion, and
means for mounting the thermometer portion to the cover portion for sliding movement of the thermometer portion relative to the cover portion while the cover portion remains coupled to the thermometer portion between a locked position to prevent the thermometer portion from pivoting relative to the cover portion and an unlocked position to permit the thermometer portion to pivot relative to the cover portion about a pivot axis to assume a use position wherein the probe is removed from a stowed position inside the cover portion.

3. The infant thermometer assembly of claim 2, wherein the cover portion includes a front wall and a rear wall coupled to the front wall and formed to define a cut-out, the thermometer portion being pivotably movable relative to the cover portion between a use position where the probe of the thermometer portion extends away from the cover portion and a stowed position where the probe of the thermometer portion is received within the cut-out of the cover portion.

4. An infant thermometer assembly comprising
a cover portion and
a thermometer portion pivotably and slidably coupled to the cover portion and formed to include a probe and a housing coupled to the probe, the housing including a display and a power button, the thermometer portion being pivotably movable relative to the cover portion about a pivot axis and slidably movable relative to the cover portion along a longitudinal axis extending along the probe between a use position and a stowed position, the cover portion including a cavity formed to receive at least a portion of the housing when the probe is in the use and stowed positions and a cut-out formed to receive the probe of the thermometer portion in the stowed position.

5. An infant thermometer assembly comprising
a cover portion and
a thermometer portion pivotably coupled to the cover portion and formed to include a probe and a housing coupled to the probe, the housing including a display and a power button, the thermometer portion being pivotably movable relative to the cover portion about a pivot axis between a use position and a stowed position, the cover portion including a cavity formed to receive at least a portion of the housing of the thermometer portion in the use and stowed positions and a cut-out formed to receive the probe of the thermometer portion in the stowed position, wherein the thermometer portion includes a guide tab coupled to the housing and the cover portion includes a guide slot formed therein to receive the guide tab in the use position.

6. The infant thermometer assembly of claim 5, wherein the cover portion includes a notch formed to receive the guide tab in the stowed position.

7. The infant thermometer assembly of claim 5, wherein the guide tab is a first guide tab and the guide slot is a first guide slot, and wherein the thermometer portion includes a second guide tab coupled to the housing and the cover portion includes a second guide slot formed therein to receive the second guide tab in the use position.

8. The infant thermometer assembly of claim 7, wherein the cover portion includes a body, a first arm coupled to the body, and a second arm coupled to the body and spaced-apart from the first arm, and wherein the first arm includes the first guide slot and the second arm includes the second guide slot.

9. The infant thermometer assembly of claim 8, wherein the first arm, the second arm, and a portion of the body cooperate to define the cavity formed to receive the portion of the housing in the use position and in the stowed position.

10. An infant thermometer assembly comprising
a cover portion and
a thermometer portion pivotably coupled to the cover portion and formed to include a probe and a housing coupled to the probe, the housing including a display and a power button, the thermometer portion being pivotably movable relative to the cover portion about a pivot axis between a use position and a stowed position, the cover portion including a cavity formed to receive at least a portion of the housing of the thermometer portion in the use and stowed positions and a cut-out formed to receive the probe of the thermometer portion in the stowed position, wherein the cover portion includes a body, a first arm appended to the body, and a second arm appended to the body, the first and second arms being spaced-apart from each other to define the cavity of the cover portion, and wherein the arms of the body are coupled to the housing of the thermometer portion.

11. The infant thermometer assembly of claim 10, wherein the body of the cover portion includes a front wall and a rear wall, and wherein the cut-out is formed in the rear wall of the cover portion.

12. The infant thermometer assembly of claim 11, wherein the cover portion includes a bore in communication with the cut-out, the bore being formed to receive at least a portion of the probe therein in the stowed position.

13. The infant thermometer assembly of claim 10, wherein the first arm of the cover portion includes a first slot and the second arm of the cover portion includes a second slot each formed to receive a portion of the housing therethrough, each of the first and second slots including a first end, a second end, and a narrowed neck between the first and second ends, and wherein the infant thermometer assembly is movable between a locked position and an unlocked position and the portion of the housing is positioned between the narrowed neck and the second end of the slot in the locked position.

14. The infant thermometer assembly of claim 13, wherein the thermometer portion includes a front wall, a rear wall, and first and second side walls each coupled to and positioned between the front and rear walls, and wherein the thermometer portion further includes a first locking lug coupled to the first side wall and second locking lug coupled to the second side wall, and wherein the first and second locking lugs are the portion of the housing received at least in part through the first and second slots of the cover portion.

15. An infant thermometer assembly comprising
a cover portion and
a thermometer portion pivotably coupled to the cover portion and formed to include a probe and a housing coupled to the probe, the housing including a display and a power button, the thermometer portion being pivotably movable relative to the cover portion about a pivot axis between a use position and a stowed position, the cover portion including a cavity formed to receive at least a portion of the housing of the thermometer portion in the use and stowed positions and a cut-out formed to receive the probe of the thermometer portion in the stowed position, wherein the thermometer portion includes a locking lug coupled to the housing of the thermometer portion and the cover portion includes a slot formed to receive a portion of the locking lug therethrough and formed to define a first end, a second end, and a neck near the second end, and wherein the thermometer portion is movable between a locked position where the locking lug is positioned between the neck and the second end and an unlocked position where the locking lug is positioned between the neck and the first end, and wherein the thermometer portion is pivotably movable relative to the cover portion when the thermometer portion is in the unlocked position.

16. The infant thermometer assembly of claim 15, wherein the thermometer portion is movable along a vertical axis extending along the slot when the thermometer portion is in the unlocked position, and wherein the thermometer portion is pivotable about an axis extending through the locking lug when the thermometer portion is in the unlocked position.

17. The infant thermometer assembly of claim 15, wherein the cover portion includes a body, a first arm coupled to the body, and a second arm coupled to the body and spaced-apart from the first arm, the locking lug is a first lug and the thermometer portion further includes a second locking lug coupled to the housing, the slot is a first slot formed in the first arm and the cover portion further includes a second slot formed in the second arm to receive at least a portion of the second locking lug therethrough.

18. The infant thermometer assembly of claim 17, wherein the thermometer portion is pivotable relative to the cover portion about a pivot axis extending through the first and second locking lugs.

19. An infant thermometer assembly comprising
a thermometer portion including a probe and a housing coupled to the probe,
a cover portion coupled to the thermometer portion, and
means for mounting the thermometer portion to the cover portion for movement of the thermometer portion relative to the cover portion between a locked position to prevent the thermometer portion from moving relative to the cover portion and an unlocked position to permit the thermometer portion to move relative to the cover portion, wherein the mounting means includes a locking lug coupled to the housing and a slot of the cover portion formed to receive a portion of the locking lug therethrough, and the slot is formed to define a first end, a second end, and a neck portion, and wherein the locking lug is positioned between the neck portion and the second end of the slot when the thermometer portion is in the locked position and the locking lug is positioned between the neck portion and the first end when the thermometer portion is in the unlocked position.

20. The infant thermometer assembly of claim 19, wherein the housing includes a front wall, a rear wall spaced-apart from the front wall, a first side wall coupled the front wall and rear wall, and a second side wall coupled to the front wall and rear wall and spaced-apart from the first side wall, the locking lug is a first locking lug coupled to the first side wall and the thermometer portion includes a second locking lug coupled to the second side wall, and further wherein the slot is a first slot formed to receive the a portion of the first locking lug and the cover portion including a second slot formed to receive the second locking lug.

21. The infant thermometer assembly of claim 20, wherein the thermometer portion includes a first guide tab coupled to the first side wall in spaced-apart relation to the first locking lug and a second guide tab coupled to the second side wall in spaced-apart relation to the second locking lug, and wherein the cover portion includes a first guide slot formed to receive the first guide tab therein and a second guide slot formed to receive the second guide tab therein.

22. The infant thermometer assembly of claim 20, wherein the cover portion includes a body, a first arm coupled to the body, and a second arm coupled to the body and spaced-apart from the first arm, and wherein the first slot is formed in the first arm and the second slot is formed in the second arm.

23. An infant thermometer assembly comprising
a thermometer portion including a probe and a housing coupled to the probe,
a cover portion coupled to the thermometer portion, and
means for mounting the thermometer portion to the cover portion for movement of the thermometer portion relative to the cover portion between a locked position to prevent the thermometer portion from moving relative to the cover portion and an unlocked position to permit the thermometer portion to move relative to the cover portion, wherein the thermometer portion includes a first guide tab coupled to the housing and a second guide tab coupled to the housing, the cover portion includes a first guide slot, a second guide slot, a first notch, and a second notch, and wherein the first guide slot receives a portion of the first guide tab and the second guide slot receives a portion of the second guide tab in the use position and the first notch receives a portion of the first guide tab and the second notch receives a portion of the second guide tab in the stowed position and wherein the cover portion includes a front wall and a rear wall coupled to the front wall and formed to define a cut-out, the thermometer portion is pivotably movable relative to the cover portion between a use position where the probe of the thermometer portion extends away from the cover portion and a stowed position where the probe of the thermometer portion is received within the cut-out of the cover portion.

24. An infant thermometer assembly comprising
a cover portion including a body formed to include a probe receiver and first and second arms coupled to the body and arranged to lie in spaced-apart relation to one another to define a probe carrier receiver therebetween, each arm being formed to include a lug-receiving slot and a narrowed neck portion extending into the slot to partition the lug-receiving slot to form an unlocking zone located between the narrowed neck portion and a distal end of said arm and a locking zone located between the unlocking zone and the body of the cover portion, and
a thermometer portion including a probe sized to fit into the probe receiver formed in the body and a probe carrier coupled to the probe and sized to fit into the probe carrier receiver defined between the first and second arms of the cover portion, the probe carrier including a first locking lug extending outwardly into the lug-receiving slot formed in the first arm and a second locking lug extending outwardly into the slot formed in the second arm, the locking lugs being configured to move back and forth in the slots between extended positions in the unlocking zones of the lug-receiving slots wherein the thermometer portion is free to pivot about a pivot axis extending through the first and second locking lugs to allow the probe to be withdrawn from the probe receiver formed in the body of the cover portion and rotated through an angle of 180° to assume a position apart from the probe receiver and a retracted position in the locking zones of the lug-receiving slots wherein the probe is one of stowed in the probe receiver formed in the body of the cover portion and placed in a temperature-taking position outside of the probe receiver.

25. The infant thermometer assembly of claim 24, wherein the thermometer portion further includes a battery pack coupled to the probe carrier, and the battery pack is arranged to lie outside the probe carrier receiver located between the first and second arms when the probe is placed in the probe receiver formed in the body of the cover portion and to lie inside the probe carrier receiver located between the first and second arms when the probe is placed in the temperature-taking position outside of the probe receiver.

26. The infant thermometer assembly of claim 24, wherein the first arm is formed to include a first guide tab slot and the thermometer portion includes a first guide tab arranged to project outwardly in a first direction from the probe carrier and to extend into the first guide tab slot to align thermometer portion with cover portion upon movement of the probe to the temperature-taking position.

27. The infant thermometer assembly of claim 26, wherein the first arm is formed to include a first notch opening into the probe receiver to provide means for receiving the first guide tab therein upon movement of the probe to a stowed position in the probe receiver.

28. The infant thermometer assembly of claim 26, wherein the second arm is formed to include a second guide tab slot and the thermometer portion includes a second guide tab arranged to project outwardly in an opposite second direction from the probe carrier and to extend into the first guide tab slot to align thermometer portion with cover portion upon movement of the probe to the temperature-taking position.

29. The infant thermometer assembly of claim 28, wherein each arm includes a distal tip facing away from the body and an inner wall defining a boundary of the probe carrier receiver, each distal tip is formed to include a front opening into one of the first and second guide tab slots, and each inner wall is formed to include a first opening into one of the first and second guide tab slots and a second opening into one of the lug-receiving slots.

30. The infant thermometer assembly of claim 28, wherein the first arm is formed to include a first notch opening into the probe receiver to provide means for receiving the first guide tab therein upon movement of the probe to a stowed position in the probe receiver and the second arm is formed to include a second notch opening into the probe receiver to provide means for receiving the second guide tab therein upon movement of the probe to the stowed position in the probe receiver.

* * * * *